United States Patent [19]

Saeki et al.

[11] 4,170,318

[45] Oct. 9, 1979

[54] FIXED VOLUME DISCHARGE DEVICE

[75] Inventors: Noriyoshi Saeki, Umezawacho-2-chome, Toyama-shi, Japan; Kiyoko Nakamura, Toyama, Japan

[73] Assignee: Noriyoshi Saeki, Toyama, Japan

[21] Appl. No.: 822,366

[22] Filed: Aug. 5, 1977

[30] Foreign Application Priority Data

Aug. 6, 1976 [JP] Japan .................................. 51-94148

[51] Int. Cl.² .............................................. G01F 11/26
[52] U.S. Cl. ................................................... 222/455
[58] Field of Search ....................... 222/454, 455, 456

[56] References Cited

U.S. PATENT DOCUMENTS

| | | | |
|---|---|---|---|
| 1,297,244 | 3/1919 | Rauen | 222/455 |
| 1,924,809 | 8/1933 | Schuelke et al. | 222/455 |
| 2,834,519 | 5/1958 | Miller | 222/455 |
| 3,023,937 | 3/1962 | Matter | 222/455 X |

Primary Examiner—Allen N. Knowles
Attorney, Agent, or Firm—Norbert P. Holler

[57] ABSTRACT

A fixed volume discharge device adapted to be mounted to a container, and having a first chamber communicating with the interior of the container and a second chamber communicating with the atmosphere, the first chamber including a narrow opening through which a liquid or a powder stored in the container flows into the first chamber when the container is downwardly inclined, and the second chamber communicating with the first chamber through holes provided in a partition wall between the first and the second chambers below the narrow opening so that the liquid or the powder trapped within the first chamber flow into the second chamber through the holes when the container is returned in its normal attitude. Thus, when the container is again downwardly inclined, the liquid or the powder within the second chamber is discharged from the second chamber while a liquid or a powder in the container flows into the first chamber in the manner described the above, thereby a predetermined fixed volume liquid or powder is discharged from the container through the fixed volume discharge device each time when the container is downwardly inclined.

9 Claims, 9 Drawing Figures

FIG. 2
FIG. 3
FIG. 4
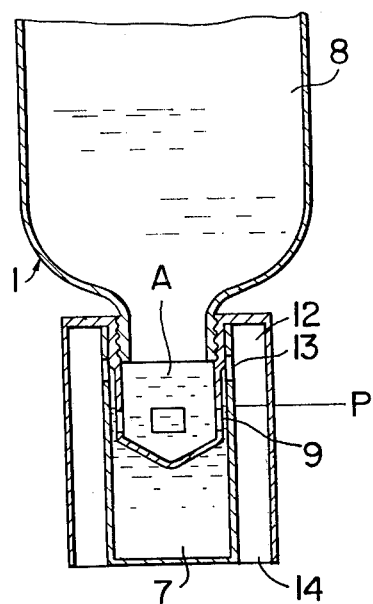
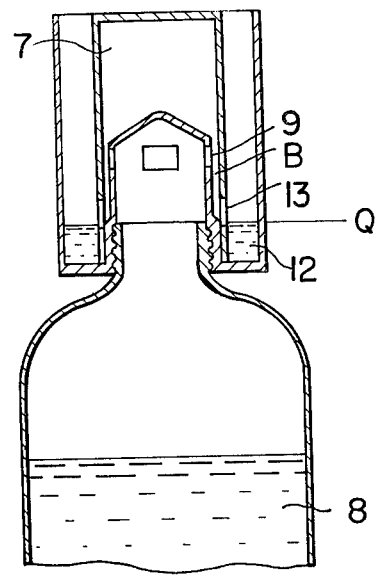
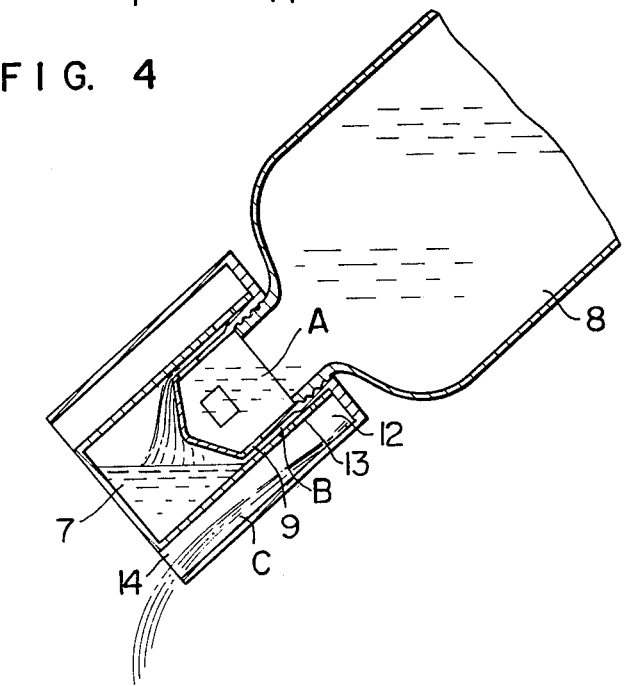

FIXED VOLUME DISCHARGE DEVICE

The invention relates to a fixed volume discharge device adapted to be mounted to a container, and is particularly concerned with the fixed volume discharge device of the kind that a predetermined fixed volume of a liquid as for example a liquid soap or a powder as for example a powdered sugar is discharged each time when the container is downwardly inclined.

Heretofore, there have been known various kinds of fixed volume discharge devices adapted to be mounted to a container for storing a liquid or a powder. However, such kinds of devices are structurally and operationally complicated.

A fixed volume discharge device disclosed in Japanese Patent Laid-Open No. 156961/75 is integrally mounted to the top portion of a container. This fixed volume discharge device comprises a chamber communicating to the interior of the container through a narrow passage, and a discharge passage having a discharge opening and communicated with the first chamber.

In order to discharge a liquid or a powder (hereinafter described as "content") from such a container, the container should be turned upside down so that the content occupies the chamber as well as a narrow passage. Since the discharge opening of the discharge passage becomes above the narrow passage when the container is upside down, the content cannot flow out the chamber as far as the container is statically upset. When the container is inclined further from the upset condition so as to the discharge passage is inclined downwardly, the content within the chamber is discharged out. However, a liquid more than that within the chamber cannot be discharged even if it is in such an inclined condition, since the narrow passage is so arranged that when the container is inclined, the opening of the narrow passage, which opens to the chamber, becomes at the upmost position of the chamber thereby the flow of the content from the container is interrupted.

There is a disadvantage in the device disclosed in the Japanese Patent Laid-Open No. 156961/75. The device should be integrally incorporated with the top portion of a container and is difficult to make removable. Therefore, the container provided with the device is of a special type.

Further, there is another disadvantage. That is: the normal or stored attitude of the container provided with the device is that the device takes the top position of the container. But in the use of the container, the container should be turned upside down and the device should be held in the bottom position. Thus, it is against the custom of using a container, since the opening of the container takes the bottom position of the container.

It is an object of the present invention to eliminate the above-mentioned disadvantage.

It is another object of the invention to provide a fixed volume discharge device which is removably mounted to a container, and which is compatible both as to size and configuration.

It is another object of the invention to provide a fixed volume discharge device which is easily handled, since to hold a container upside down is unnecessary.

According to one aspect of the invention, there is provided a fixed volume discharge device comprising a cap portion adapted to be fitted to the opening of a container, a first chamber having a narrow opening through which the content in the container flows into the first chamber when the container is downwardly inclined, a partition wall provided with holes which are positioned above the narrow opening at a predetermined distance when the container takes its normal attitude, and a second chamber having a discharge opening and communicating with the first chamber through the holes, the first chamber and the second chamber being divided by the partition wall.

According to a preferable embodiment of the invention, when the device according to the present invention is fitted to the opening of a container, the first chamber and the second chamber take their position outside of the container, the first chamber being defined within a space surrounded by the partition wall.

According to another preferable embodiment of the invention, when the device according to the invention is fitted to the opening of a container, the first and second chambers take their position inside of the container, the first chamber being defined between the peripheral wall of the neck portion of the container and the wall of the discharge opening.

Other features and advantages of the invention will be apparent from the following description taken in connection with the accompanying drawing, wherein:

FIG. 2 is a partial cross-sectional view of FIG. 1, showing that the fixed volume discharge device and the container are turned upside down;

FIG. 3 is also the same partial cross-sectional view as FIG. 2, however, illustrating that the fixed volume discharge device and the container take their normal attitudes;

FIG. 4 is the same partial cross-sectional view as FIG. 2, however, showing that the fixed volume discharge device and the container are downwardly inclined;

Figure 1:
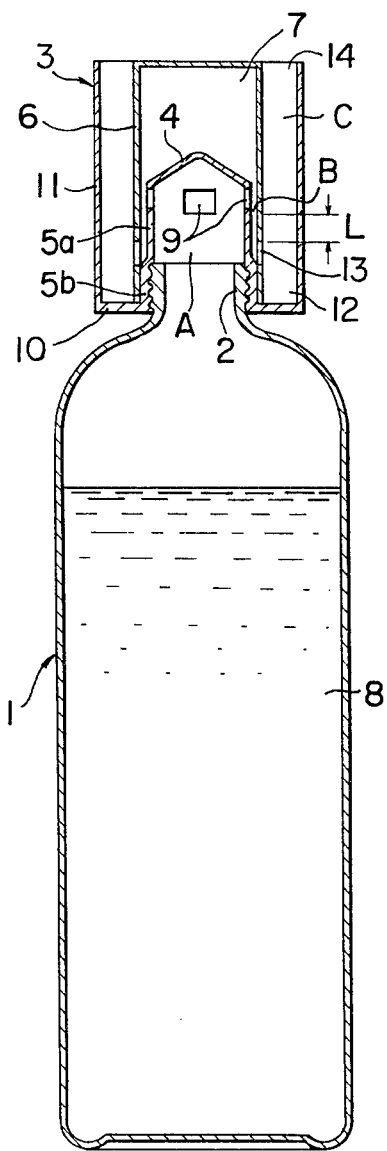
FIG. 1 illustrates a first embodiment of the invention wherein a fixed volume discharge device and a container provided therewith are shown in a cross-sectional view.

Referring to FIGS. 1 to 4, a first embodiment of the present invention will be described.

Reference numeral 1 denotes a container such as for example a bottle for containing a liquid soap. A fixed volume discharge device 3 according to the present invention is provided onto the neck portion 2 of the container 1.

The fixed volume discharge device 3 mainly consists of an inner cap 4, an outer cap 6 fitted onto the inner cap 4, and a cylindrical wall 11 having an annular flange 10 integrally incorporated with the inner cap 4.

The inner cap 4 is adapted to be fitted onto the neck portion 2 of the container 1. The inner cap 4 has a plurality of openings 9 in the top peripheral wall 5a. The bottom peripheral wall 5b of the inner cap 4 is outwardly thickened so that the inner cap 4 has a shoulder portion as the transition zone between the top and bottom peripheral walls. The inner surface of the bottom peripheral wall 5b is fitted onto the outer peripheral surface of the neck portion 2 by means of, for example, threaded means provided thereto. The outer cap 6 is fitted onto the thickened bottom peripheral wall 5b. Between the inner peripheral surface of the outer cap 6 and the outer peripheral surface of the top peripheral wall 5b of the inner cap 4, an annular passage B is defined. Just above the shoulder portion of the thickned bottom peripheral wall 5b, a plurality of holes 13 are provided in the peripheral wall of the outer cap 6. The cylindrical wall 11 is so arranged as to entirely surround the outer cap 6 and to be supported by the bottom peripheral wall 5b through the annular flange 10 extending inwardly from the lower edge of the cylindrical wall 11. Between the outer and inner caps 4 and 6, there is defined a first chamber 7. Further, between the cylindrical wall 11 having the annular flange 10 and the outer cap 6, a second chamber 12 is defined.

The openings 9 are so arranged that when the container 1 takes its normal attitude the openings become above the holes 13 at a predetermined distance L. The size of each opening 9 is so selected that a content filled in the container 1 may promptly flow through the holes 9. For example, in the case of a liquid soap, 10 mm long and 10 mm broad are preferable.

The upper end of the cylindrical wall 11 defines an annular outlet opening 14 with the upper edge of the outer cap 6.

The operation of the first volume discharge device will now be explained, referring to FIGS. 1 to 4.

When the content 8 in the container 1 will be discharged, the container 1 with the fixed volume discharge device 3 is turned upside down. The content 8 flows from a portion A within the container 1 into the first chamber 7 through the openings 9. When the content 8 occupies the first chamber 7 sufficiently that the content covers the openings 9, as shown in FIG. 2, the flow of the content promptly ceases. Even if the content is a liquid such as for example a liquid soap, the liquid which seals the openings 9 within the first chamber 7 shuts an air flow to the container 1 through the openings 9, thereby to surely stop the flow of the liquid from the container 1.

When the container 1 is again returned to its normal position, the content occupying the first chamber 7 flows into the second chamber 12 through the annular space B and the holes 13, as shown in FIG. 3. Of course, a part of the content in the first chamber 7 returns into the container 1 through the openings 9. However, such a part of the content is not appreciable in its amount, since the arrangement and the size of the openings 9 are so suitably selected that the part of the content which is returned to the container 1 becomes minimum.

It should be noted that the level Q of the content within the second chamber 12 should be held below the upper edges of the holes 13, which level Q is inherent to a predetermined fixed discharging volume, since when the content in the second chamber 12 covers or seals the holes 13, the flow from the first chamber 7 to the second chamber 12 has to automatically cease.

As the container 1 is downwardly inclined, the content in the second chamber 12 is discharged from the outlet opening 14, while the content 8 in the container 1 flows into the first chamber 7 in the manner as mentioned above. The discharge volume of the content is no more than that within the second chamber 7, since the content from the container 1 is held within the first chamber 7 even when the container is inclined and then turned upside down.

It is easily understood that each discharge volume is substantially determined by the cross-sectional area of the outer cap 6 and the level of the openings 9.

Figure 5:
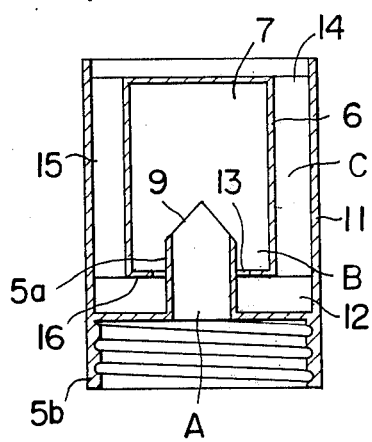
FIG. 5 illustrates the first modification of the first embodiment in a cross-sectional view.

FIG. 5 shows a first modification of the first embodiment wherein the cylindrical wall 11 has the same outer diameter as that of the bottom peripheral wall 5b of the inner cap 4. The top peripheral wall 5a has a relatively small diameter in comparison with that of the first embodiment as shown in FIGS. 1 to 4. The outer cap 6 in which the first chamber 7 is defined, is provided with an annular flange 16 at the opening end inside the outer cap 6. The outer cap 6 is supported by the cylindrical wall 11 through supporting pieces 15. The flange 16 is provided with holes 13. Instead of the provision of the openings 9 in the top peripheral wall 5a, the top peripheral wall 5a is cut slanted so as to form an opening 9 in a "V"-like shape.

In such a construction of the first modification of the first embodiment, the content within the first chamber 7 flows downwardly through the holes 13 and occupies the bottom portion of the second chamber 12 below the flange 16 and above the shoulder portion of the cap 4.

Figure 6:
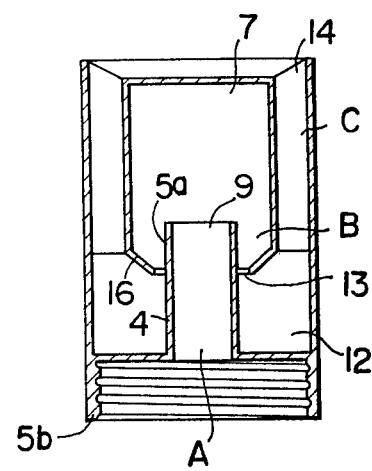
FIG. 6 illustrates the second modification of the first embodiment in a cross-sectional view.

FIG. 6 shown the second modification of the first embodiment which is substantially similar to the first modification in FIG. 5. However, the top peripheral wall 5b is horizontally cut to form an opening 9. Further, instead of the flange 16 a conical wall 16 is provided at the opening end inside the outer cap 6.

The conical wall is downwardly tapered and in the lowermost portion thereof provided with holes 13.

Figure 7:
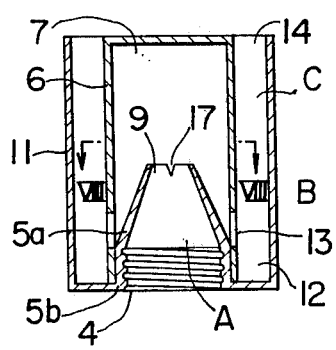
FIG. 7 illustrates the third modification of the first embodiment in a cross-sectional view.
Figure 8:
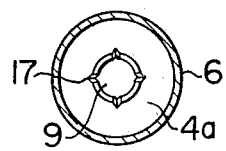
FIG. 8 illustrates a cross-sectional view taken along line VII—VII of FIG. 7.

FIGS. 7 and 8 show the third modification of the first embodiment wherein the top peripheral wall 5a of the inner cap 4 is tapered upwardly from the bottom peripheral wall 5b and the uppermost portion of the tapered top peripheral wall 5a is horizontally cut to form an opening 9. The opening 9 is provided with notches 17 spaced around the periphery of the opening 9 thereby to provide a smooth flow from the container 1 to the first chamber 7.

Figure 9:
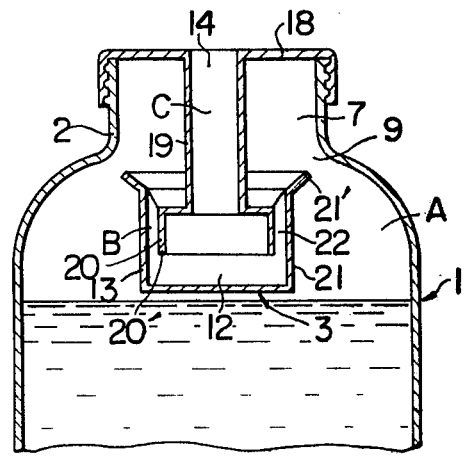
FIG. 9 illustrates the second embodiment of the invention wherein a fixed volume discharge device and a container provided therewith are shown in a cross-sectional view.

FIG. 9 shows a second embodiment of the present invention. The fixed volume discharge device 3 of the first embodiment is mounted outside the container 1. However, the fixed volume discharge device 3 of the second embodiment is adapted to be entirely disposed within the container 1. The device of the second embodiment is preferably used when the openings of the container has a large diameter. In the second embodiment, the fixed volume discharge device 3 is carried by a conduit 19 inside of which defines an outlet passage C. The diameter of the conduit 19 is abruptly increased at the lower portion 20'. The first chamber 7 is defined between the neck portion 2 of the container 1 and the outer peripheral surface of the conduit 19. The second chamber 12 is defined within a cup 21 having a flared end 21'. The cup 21 is carried by the lower end portion 20 of the conduit 19 through supporting pieces 22.

In this second embodiment, when the container 1 is turned upside down, the content in the container 1 flows into the first chamber through an annular opening 9 defined between the inner peripheral surface of the neck portion 2 and the edge of the flared end 21'. In this reverted condition of the container 1, the flow of the content ceases when the content completely covers the annular opening 9. When the container 1 is returned to its normal attitude, the content within the first chamber 7 flows in the second chamber 12 defined within the cup 21 through an annular passage B. Further, when the container 1 is inclined, the content within the second chamber 12 is discharged out the opening 14 through the passage C.

It is appreciated that the opening 14 may preferably be blocked by a plug (not shown).

While preferred embodiments of the invention have been described, such a description is for illustrated purpose only and it is to be understood that the changes and the variations may be made without departing from the spirit or scope of the following claims.

For example, the fixed volume discharge device according to the present invention may be made of any suitable material. However, the device is preferably made of a transparent material so as to be possible to check the condition of the content occupying the first chamber 7 and the second chamber 12 of the device.

We claim:

1. A fixed volume discharge device adapted to be mounted to the opening of a container, comprising:
    i. an inner cap having a first peripheral wall the lower end portion of which is fitted onto the neck portion of the container;
    ii. an outer cap having top wall and a second peripheral wall which is integrally connected at its lower end to the outer surface of said first peripheral wall, and encasing said inner cap therewithin so as to define an annular gap between said first and second peripheral walls;
    iii. a first chamber defined within said outer cap above said inner cap;
    iv. a first opening means provided in said inner cap for communicating said first chamber with the interior of the container;
    v. a wall member surrounding said outer cap and having an annular flange extending from the lower periphery thereof toward said second peripheral wall of said outer cap, the inner periphery of the annular flange being integrally jointed to the lower outer surface of said second peripheral wall;
    vi. a second chamber defined within said wall member outside of said outer cap;
    vii. a second opening means provided in said second peripheral wall for communicating said second chamber with the lowermost portion of said first chamber, said second chamber being positioned below said second openings; and
    viii. a discharging outlet communicating said second chamber with the atmosphere.

2. A fixed volume discharge device as set forth in claim 1 wherein said annular gap is arranged about the content trapped within the second chamber when the container takes its normal attitude.

3. A fixed volume dischage device as set forth in claim 1 wherein the first opening means has an end which is slantly cut so as to form a "V" like shape opening.

4. A fixed volume discharge device as set forth in claim 1, wherein said fixed volume discharge device is made of a transparent material.

5. A fixed volume discharge device as set forth in claim 1, wherein said inner cap has a cone-shape top wall so that the contents supplied from the container to said first chamber smoothly flows down without being trapped when the container is returned to its normal attitude from its downwardly inclined attitude.

6. A fixed volume discharge device as set forth in claim 1, wherein said discharge outlet is defined between the top periphery of said wall member and the outer surface of said second peripheral wall.

7. A fixed volume discharge device as set forth in claim 6, wherein said discharging outlet is of an annular shape so that the content trapped within said second chamber can be discharged whenever the container is downwardly inclined in any direction.

8. A fixed volume discharge device as set forth in claim 1 wherein said first opening means is tapered toward a top end having a peripheral edge and a plurality of notches are spaced about the edge.

9. A fixed volume discharge device as set forth in claim 1 wherein the first and second opening means each comprise a plurality of openings.

* * * * *